(12) United States Patent
Mazowiesky

(10) Patent No.: US 7,757,951 B2
(45) Date of Patent: Jul. 20, 2010

(54) INFORMATION READERS, APPARATUSES INCLUDING INFORMATION READERS, AND RELATED METHODS

(75) Inventor: Thomas Mazowiesky, Patchogue, NY (US)

(73) Assignee: Global Payment Technologies, Inc., Hauppauge, NY (US)

( * ) Notice: Subject to any disclaimer, the term of this patent is extended or adjusted under 35 U.S.C. 154(b) by 1006 days.

(21) Appl. No.: 11/506,190

(22) Filed: Aug. 18, 2006

(65) Prior Publication Data

US 2007/0040029 A1 Feb. 22, 2007

(30) Foreign Application Priority Data

Aug. 14, 2006 (WO) .............. PCT/US2006/031671

(51) Int. Cl.
*G06K 7/00* (2006.01)
(52) U.S. Cl. ................... 235/440; 235/435; 235/462.12
(58) Field of Classification Search ............ 235/462.12, 235/382, 435, 436, 439, 440, 462.01
See application file for complete search history.

(56) References Cited

U.S. PATENT DOCUMENTS

| | | | |
|---|---|---|---|
| 3,937,926 A | 2/1976 | Jones et al. |
| 4,091,271 A | 5/1978 | Jones et al. |
| 4,563,771 A | 1/1986 | Gorgone et al. |
| 4,587,434 A | 5/1986 | Roes et al. |
| 5,209,395 A | 5/1993 | Zouzoulas et al. |
| 5,220,665 A | 6/1993 | Coyle, Jr. et al. |
| 5,265,008 A | 11/1993 | Benton et al. |
| 5,288,980 A | 2/1994 | Patel et al. |
| 5,420,406 A | 5/1995 | Izawa et al. |
| 5,548,110 A | 8/1996 | Storch et al. |
| 5,553,859 A | 9/1996 | Kelly et al. |
| 5,617,528 A | 4/1997 | Stechmann et al. |
| 5,625,663 A | 4/1997 | Swerdloff et al. |
| 5,649,185 A | 7/1997 | Antognini et al. |
| 5,730,271 A | 3/1998 | Buchman et al. |
| 5,781,654 A | 7/1998 | Carney |
| 5,836,435 A | 11/1998 | Fujita et al. |
| 5,890,141 A | 3/1999 | Carney et al. |
| 5,974,150 A | 10/1999 | Kaish et al. |
| 6,062,481 A | 5/2000 | Storch et al. |
| 6,076,826 A | 6/2000 | Gerlier et al. |
| 6,155,491 A | 12/2000 | Dueker et al. |
| 6,181,814 B1 | 1/2001 | Carney |
| 6,233,340 B1 | 5/2001 | Sandru |

(Continued)

FOREIGN PATENT DOCUMENTS

EP 0 525 806 A2 2/1993

(Continued)

OTHER PUBLICATIONS

International Search Report dated Jan. 15, 2007, 10 pages.

(Continued)

*Primary Examiner*—Seung H Lee
(74) *Attorney, Agent, or Firm*—Finnegan Henderson Farabow Garrett & Dunner LLP

(57) ABSTRACT

This invention relates to the field of information reading, and more specifically, to an improved information reader in a validator which eliminates the requirement to insert an information source in a particular direction in an information reader.

11 Claims, 8 Drawing Sheets

U.S. PATENT DOCUMENTS

| | | | |
|---|---|---|---|
| 6,304,660 B1 | 10/2001 | Ehrhart et al. | |
| 6,371,473 B1 | 4/2002 | Saltsov et al. | |
| 6,405,929 B1 | 6/2002 | Ehrhart et al. | |
| 6,419,157 B1 | 7/2002 | Ehrhart et al. | |
| 6,450,403 B1 | 9/2002 | Martens et al. | |
| 6,457,640 B2 | 10/2002 | Ramachandran et al. | |
| 6,466,830 B1 | 10/2002 | Manross et al. | |
| 6,549,624 B1 | 4/2003 | Sandru | |
| 6,598,788 B1 | 7/2003 | Dabrowski | |
| 6,603,872 B2 | 8/2003 | Jones et al. | |
| 6,644,773 B2 | 11/2003 | Bildstein et al. | |
| 6,678,402 B2 | 1/2004 | Jones et al. | |
| 6,714,288 B2 | 3/2004 | Cohen | |
| 6,724,926 B2 | 4/2004 | Jones et al. | |
| 6,724,927 B2 | 4/2004 | Jones et al. | |
| 6,757,700 B1 | 6/2004 | Druck | |
| 6,792,110 B2 | 9/2004 | Sandru | |
| 6,802,006 B1 | 10/2004 | Bodrov | |
| 6,802,452 B2 * | 10/2004 | Lebaschi et al. | 235/476 |
| 6,848,561 B2 | 2/2005 | Bao | |
| 6,868,187 B2 | 3/2005 | Ito | |
| 6,874,682 B2 | 4/2005 | Utz et al. | |
| 6,901,862 B2 | 6/2005 | Yamaguchi et al. | |
| 6,959,859 B2 | 11/2005 | Saltsov et al. | |
| 6,966,712 B2 | 11/2005 | Trelewicz et al. | |
| 6,981,637 B2 | 1/2006 | Nagayoshi et al. | |
| 6,993,507 B2 | 1/2006 | Meyer et al. | |
| 2001/0015311 A1 | 8/2001 | Mennie | |
| 2003/0202690 A1 | 10/2003 | Jones et al. | |
| 2004/0028266 A1 | 2/2004 | Jones et al. | |
| 2005/0040225 A1 | 2/2005 | Csulits et al. | |
| 2005/0047642 A1 | 3/2005 | Jones et al. | |
| 2005/0117791 A2 | 6/2005 | Raterman et al. | |
| 2005/0117792 A2 | 6/2005 | Graves et al. | |
| 2005/0163361 A1 | 7/2005 | Jones et al. | |
| 2005/0163362 A1 | 7/2005 | Jones et al. | |
| 2005/0169511 A1 | 8/2005 | Jones | |
| 2005/0183928 A1 | 8/2005 | Jones et al. | |
| 2005/0276458 A1 | 12/2005 | Jones et al. | |
| 2005/0278239 A1 | 12/2005 | Jones et al. | |

FOREIGN PATENT DOCUMENTS

| | | |
|---|---|---|
| EP | 1 422 653 A2 | 5/2004 |
| FR | 2 783 961 A1 | 3/2000 |

OTHER PUBLICATIONS

"Edge Detection Methods"; http,//www.owlnet.rice.edu/~elec539/Projects97/segment/edge.html; retrieved on Nov. 11, 2006; 3 pages.

"First Maine casino selects JCM bill acceptor"; http://www.selfserviceworld.com/article_printable.php?id=3931&page=38; retrieved on Nov. 11, 2006; 2 pages.

\* cited by examiner

INFORMATION READERS, APPARATUSES INCLUDING INFORMATION READERS, AND RELATED METHODS

BACKGROUND OF THE INVENTION

This invention relates to the field of barcode reading, and more specifically, to an improved barcode reader in a currency validator which eliminates the requirement to insert a barcode coupon in a particular direction in a reader.

In the casino gaming industry, the use of barcode coupons has risen in recent years. These 'cashless' systems allow a player to transfer funds using a printed barcode coupon.

For example, a coupon can be inserted into a slot machine game via the currency validator. The currency validator reads the coupon and transmits the coupon number to the machine. The slot machine then transmits the coupon number to a central system, which verifies the coupon number, and then transmits a stored linked value to the slot machine game. The slot machine game credits the customer with the transmitted value, allowing the customer to play the game. After the customer completes game play, he 'cashes out' by hitting a button on the slot machine. The slot machine signals the central system, transferring the credit to the system or the player. The system then instructs the game to print a new barcode coupon. The user can then take the coupon and play another game, or go to the cashier and receive money in exchange for the coupon.

This system allows the casino to eliminate much of the time and expense devoted to cash handling. Cash need not be secured, counted, guarded, etc—the only effort expended is for a computer system to keep track of the value the customer has earned while transferring between games. Since the coupons have no inherent value once redeemed by the system, used coupons are discarded and need not be handled, as currency would be.

Until now, the validators that read the coupons have been limited to reading coupons either face up or face down when inserted in the reader, as the validators contain only one barcode reader device either above or below the bill channel. When inserted in the wrong direction, the coupon will be rejected, causing the customer to re-insert the coupon until he hopefully discovers his error and inserts it properly. This limitation can confuse the customer and cause play to be delayed, thus reducing the revenue to the casino. In some cases, the customer may get frustrated to the point that he cashes out and takes his business elsewhere.

SUMMARY OF THE INVENTION

Methods and apparatus are disclosed in which a barcode reading device is placed both above and below a coupon. According to one embodiment, the barcode reading device may simultaneously read both sides of the coupon. The results from the reader may be used to transfer a number from the coupon-to a host computer system.

According to another embodiment, a coupon printed with barcodes on both sides of the coupon is provided, and then read by the dual barcode reader.

Another embodiment of the invention may include a device for validating barcoded coupons. The device may include a means for forming a bill channel with an entrance and exit, a means for positioning a barcode reading detector above the bill channel, a means for positioning a barcode reading detector below the bill channel, a means to transport the coupon so that the barcode symbols on the coupon are moved perpendicular to the barcode detectors, a means to sample the signal from the barcode detectors, a means for storing digital representations of the samples from the barcode detectors, and/or a means for analyzing the digital representations of the sampled signals to determine and decode the coupon number and/or the digital representations stored therein.

Another embodiment of the invention may include a device for validating barcoded coupons. The device may include a means for forming a bill channel with an entrance and exit, a means for positioning a barcode reading detector above the bill channel, a means for positioning a barcode reading detector below the bill channel, a means to transport the coupon so that the barcode symbols on the coupon are moved perpendicular to the barcode detectors, a means to sample the signal from the barcode detectors constructing a digital representation of the sampled signal, and/or a means for analyzing the digital representations of the sampled signals to determine and decode the coupon number and/or the digital representations stored therein.

Various embodiments of the invention may include one or more of the following aspects: the number decoded from the barcode detectors may be combined together to form a decoded coupon number with the sum of digits of the separate barcode numbers; the number decoded may be the product of the separate barcode coupon numbers; and the separate coupon numbers may be prime numbers.

A further embodiment of the invention may include a validator. The validator may include at least two information readers configured to read information from an information source and a transporter configured to physically transport the information source past the at least two information readers such that at least one of the at least two information readers reads information from the information source.

Various embodiments of the invention may include one or more of the following aspects: the at least two information readers may be configured to read information from different sides of the information source; the at least two information readers may be offset from each other in a direction of transport of the information source; a housing; the at least two information readers may be disposed in the housing such that each of the at least two information readers can only read information disposed on one side of the information source; the at least two information readers may be disposed in the housing such that a first of the at least two information readers can only read information disposed on a first side of the information source and a first of the at least two information readers can only read information disposed on a second side of the information source different from the first side; and a system including the validator.

Yet another embodiment of the invention may include a validator. The validator may include a first information reader configured to read a first information portion disposed on a first portion of an information source, a second information reader configured to read a second information portion disposed on a second portion of the information source different from the first portion, a transporter configured to physically transport the information source past the first information reader and the second information reader such that the first information reader reads the first information portion from the first portion of the information source and the second information reader reads the second information portion from the second portion of the information source, and a microprocessor configured to combine the first information portion and a second information portion into a third information portion.

Various embodiments of the invention may include one or more of the following aspects: a housing; the first information portion may be disposed in the housing on a first side of the information source and the second information portion is disposed in the housing on a second side of the information source different from the first side; the at least two information readers may be offset from each other in the housing in a direction of transport of the information source; the first information portion may be a first barcode portion; the second information portion may be a second barcode portion; and the third information portion may be a complete barcode; the complete barcode may have more than 20 characters; and a system including the validator.

Still another embodiment of the invention may include a method. The method may include providing a validator including at least two information readers, inserting an information source into the validator, transporting the information source past the at least two information readers, and reading information from the information source via at least one of the at least two information readers.

Various embodiments of the invention may include one or more of the following aspects: reading information from the information source via both of the at least two information readers; reading a first information portion via a first of the at least two information readers and reading a second information portion via a second of the at least two information readers; reading a first information portion from a first side of the information source via a first of the at least two information readers and reading a second information portion from a second side of the information source via a second of the at least two information readers; and a first information portion may be read by a first of the at least two information readers during a first time interval and a second information portion may be read by a second of the at least information readers during a second time interval different from the first time interval.

A still further embodiment of the invention may include a method. The method may include providing a validator including a first information reader and a second information reader, inserting an information source into the validator, transporting the information source past the first information reader and the second information reader, reading a first information portion from the information source via the first information reader and a second information portion from the information source via the second information reader, and combining the first information and the second information portion into a third information portion.

Various embodiments of the invention may include one or more of the following aspects: the first information portion may be disposed on a first side of the information source and the second information portion may be disposed on a second side of the information source different from the first side; the first information portion may be read by the first information reader during a first time interval and the second information portion may be read by the second information reader during a second time interval different from the first time interval; the first information portion may be a first barcode portion, the second information portion may be a second barcode portion, and the third information portion may be a complete barcode; and the complete barcode may have more than 20 characters.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the exemplary embodiments of the invention, examples of which are illustrated in the accompanying drawings. Wherever possible, the same reference numbers will be used throughout the drawings to refer to the same or like parts.

Figure 1:
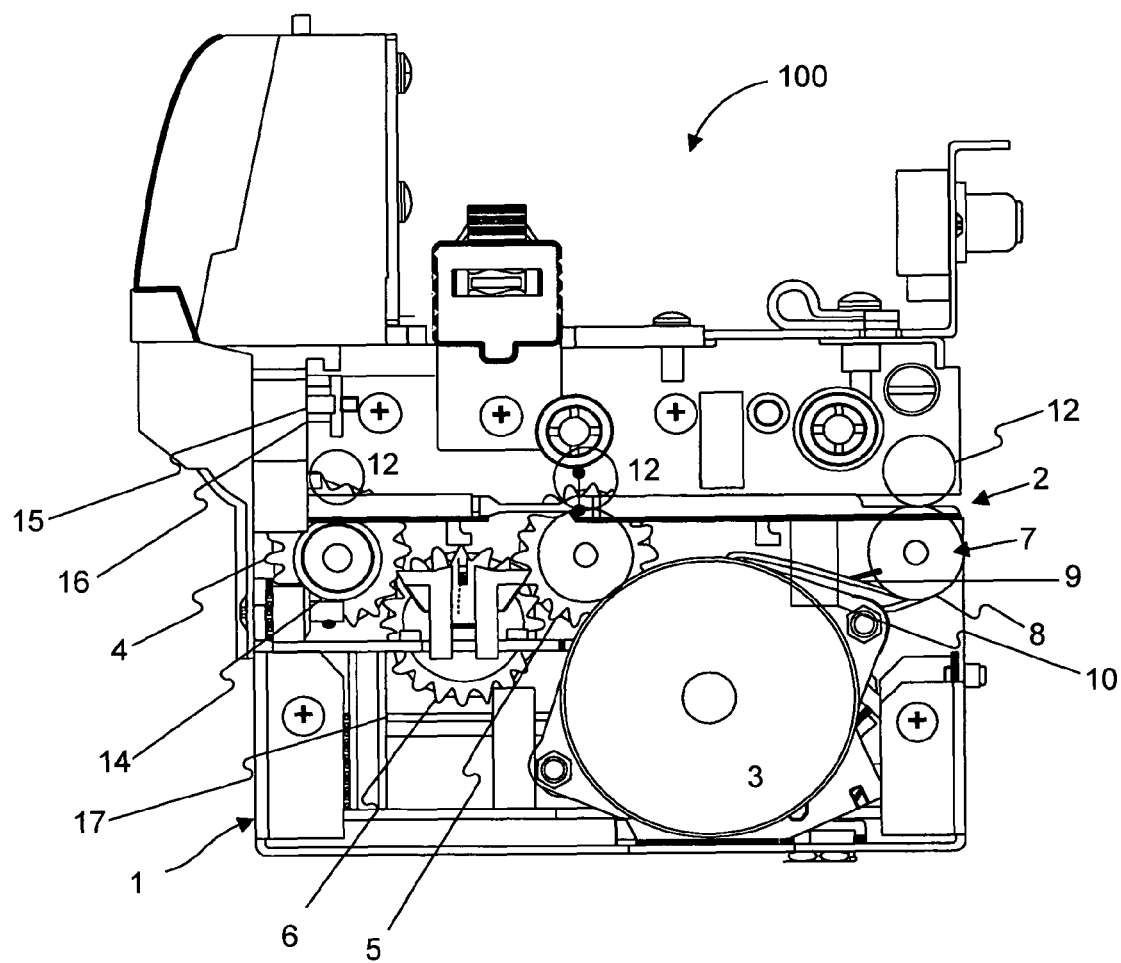
FIG. 1 depicts a validator, according to an exemplary embodiment of the invention.
Figure 4:
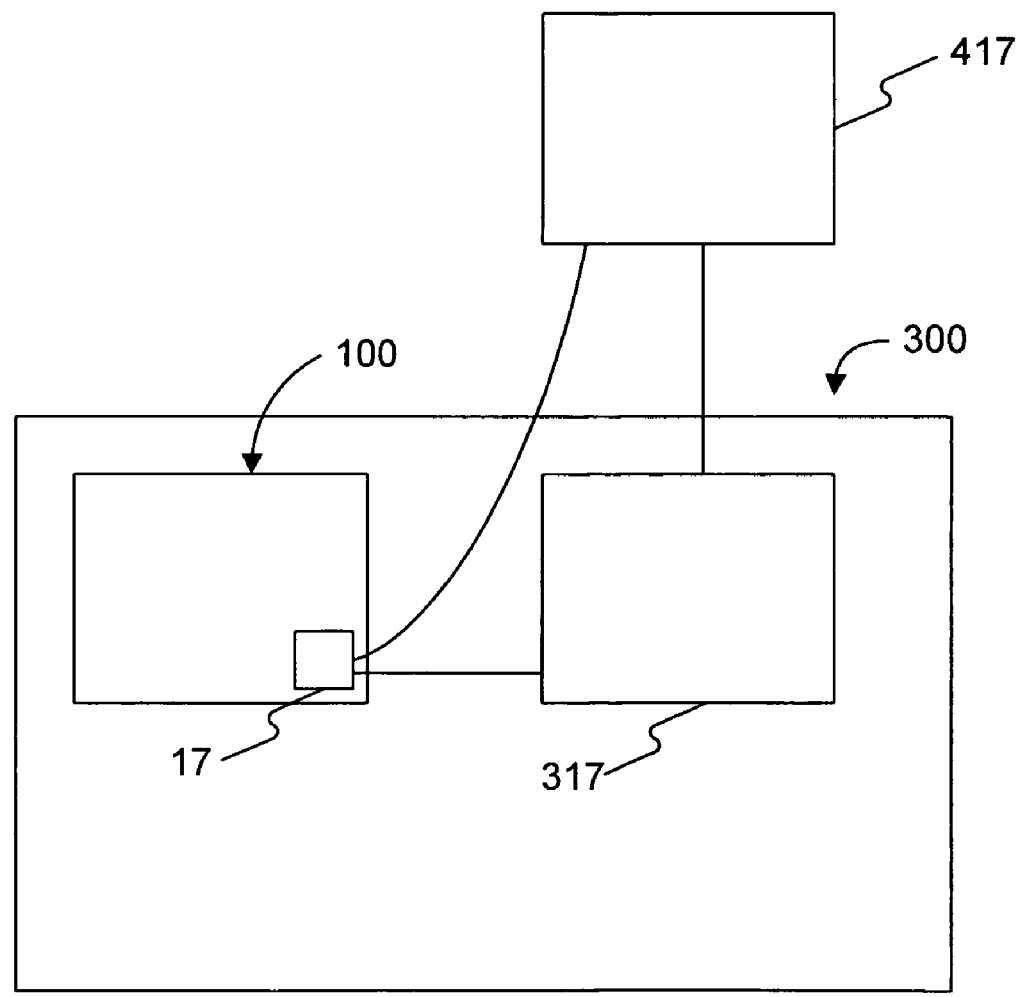
FIG. 4 depicts an apparatus including the validator of FIG. 1.

FIG. 1 depicts a validator 100 according to one embodiment consistent with the principles of the present invention. Validator 100 may include a housing 1 and may be disposed in apparatus 300, for example, as shown in FIG. 4. Housing 1 may house, accommodate, and/or define one or more of insertion channel(s) 2, actuator(s) 3, gear(s) 4, 5, 6, pulley(s) 7, drive belts 8, 9, first information reader 10, second information reader 11, roller(s) 12, drive wheel(s) 14, first signal source 15, first signal detector 16, and microprocessor 17. Validator 100 may be disposed in any suitable apparatus 300 as shown in FIG. 4, for example, a slot machine.

Portions of validator 100 defining and/or surrounding insertion channel 2 may be configured to receive and transport an information source 200, examples of which are shown in FIGS. 3A-3D, inserted therein. Specifically, a combination of one or more actuator(s) 3, gear(s) 4, 5, 6, pulley(s) 7, drive belts 8, 9, roller(s) 12, and drive wheel(s) 14 may be configured to receive and transport information source 200, for example, those shown in any one of FIGS. 3A-3D.

First signal source 15 and first signal detector 16 may be disposed inside housing 1 and/or around insertion channel 2 such that when no information source 200 is disposed in validator 100 first signal detector 16 receives a substantially continuous signal from first signal source 15. When information source 200 is inserted into insertion channel 2, however, information source 200, or some other portion of validator 100 configured to move due to the insertion of information source 200, may partially or completely block the signal from first light source 15 and prevent all or part of the signal from reaching first signal detector 16. First signal detector 16 may then inform microprocessor 17 that it is no longer receiving a signal from first signal source 15 (e.g., by sending a signal or ceasing to send a signal), and in turn microprocessor 17 may activate actuator 3. Actuator 3 may then cause roller(s) 12 and drive wheel(s) 14 to transport information source 200 via one or more of gear(s) 4, 5, 6, pulley(s) 7, and drive belts 8, 9. Information source 200 may be transported in any direction, for example, away from insertion channel 2. If information 201 is a barcode, validator 100 may be configured to move information 201 in a direction substantially perpendicular to information readers 10, 11. Microprocessor 17 may be configured to transport information source 200 through validator 100 at any rate, for example, at a substantially constant and/or steady rate such that information source 200 does not stop in insertion channel 2. This may be to assist information readers 10, 11 in reading information 201 from information source 200. It should be understood, however, that information source 200 may transport through validator 100 using any known device and/or method.

Figure 2:
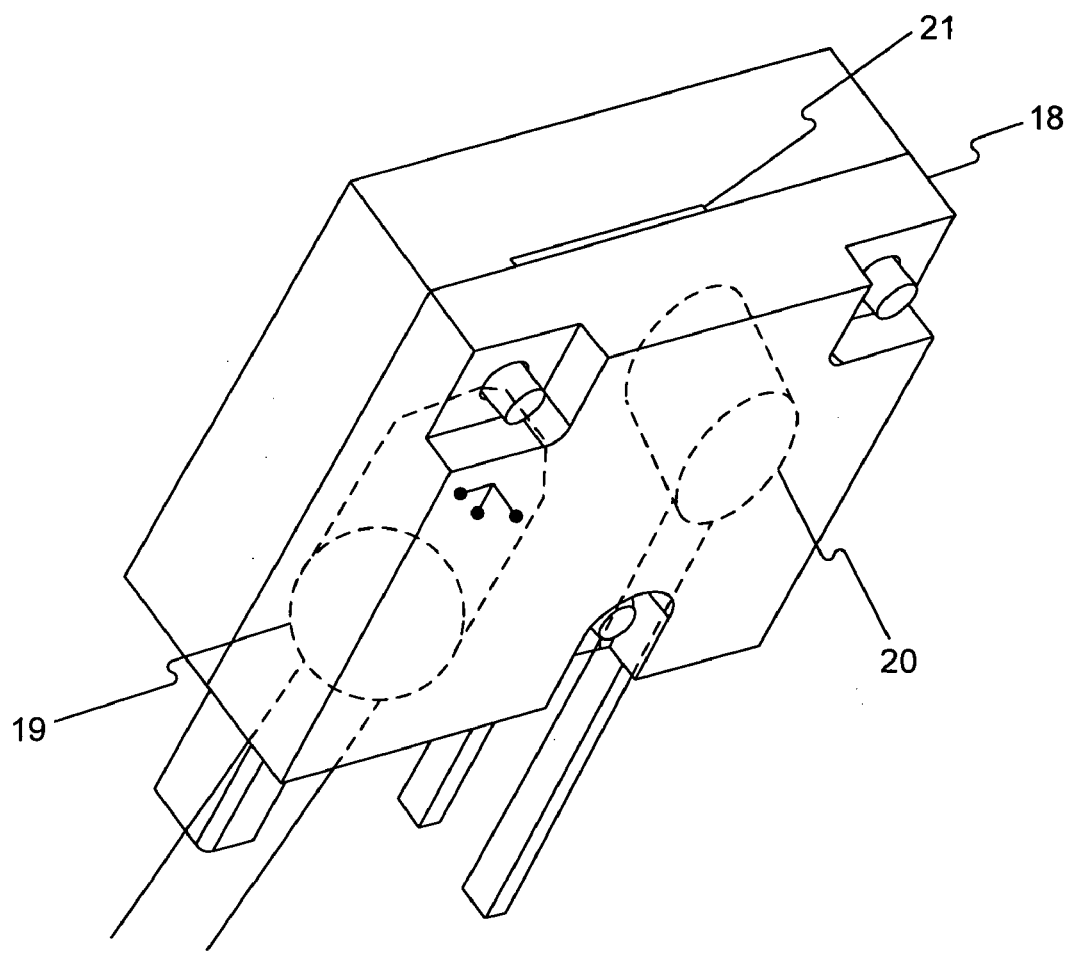
FIG. 2 depicts an information reader of the validator of FIG. 1.

As shown in FIG. 2, information readers 10, 11 may each include one or more of housing 18, second signal source 20, second signal detector 19, and slit 21. Information readers 10, 11 may include a barcode reader, for example, a barcode reader manufactured by OPTO TECHNOLOGY, INC. including the OTBC-06XX series (e.g., OTR 680/690). Information readers 10, 11 may operate using any known method and/or algorithm. For example, second signal source 20 may project a signal through slit 21. The signal may impinge on an information source, for example, information source 200. Information source 200 and/or information 201 disposed on information source 200 may alter and/or reflect at least a portion of the signal from second signal source 20 to second signal detector 19. Second signal detector 19 may detect the altered/reflected signal and/or information 201 and send it to microprocessor 17 for processing. Information readers 10, 11 may be configured such that unless second signal detector 19 is detecting a signal altered and/or reflected by information 201 (e.g., a barcode), second signal detector 19 will not send a signal and/or information 201 to microprocessor 17. In the alternative, information readers 10, 11 may send a continuous signal to microprocessor 17, and microprocessor 17 may determine which of these continuous signals is information 201.

Figure 6A:
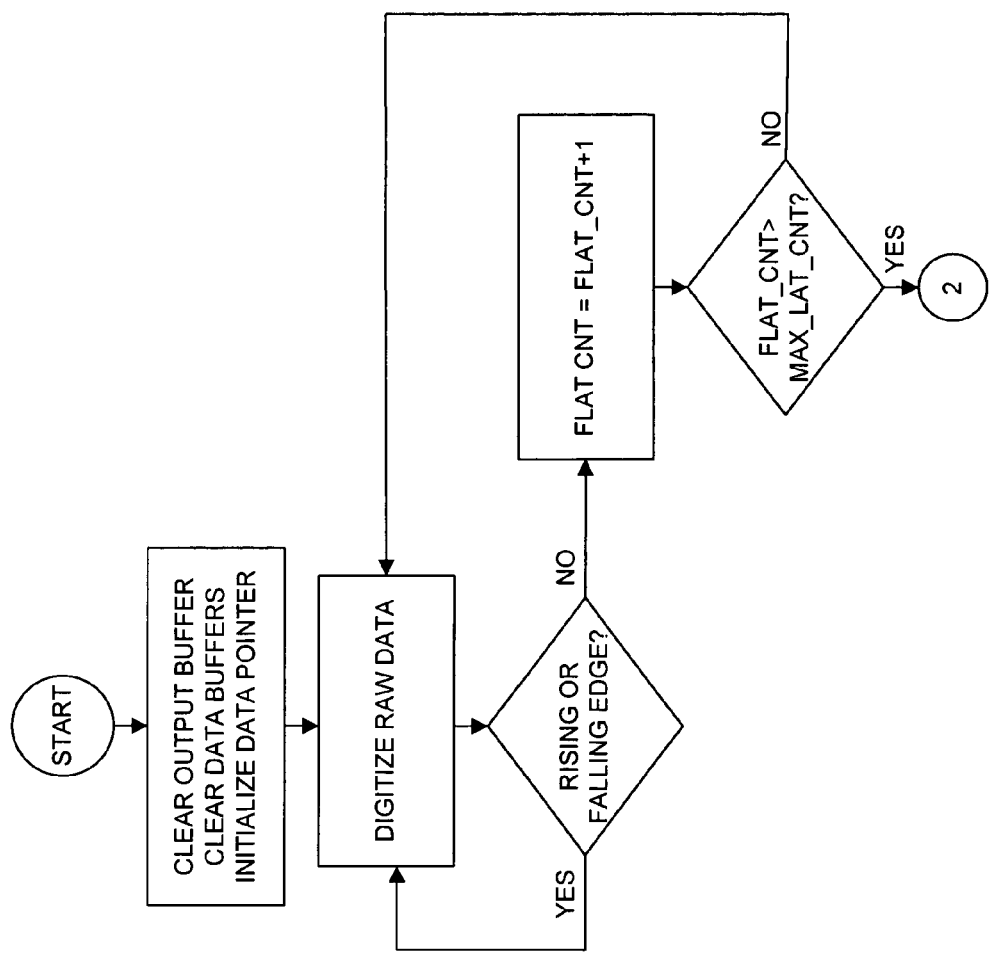
FIGS. 6A and 6B depict a method of reading information, for example, a barcode, according to still another embodiment of the invention.
Figure 6B:
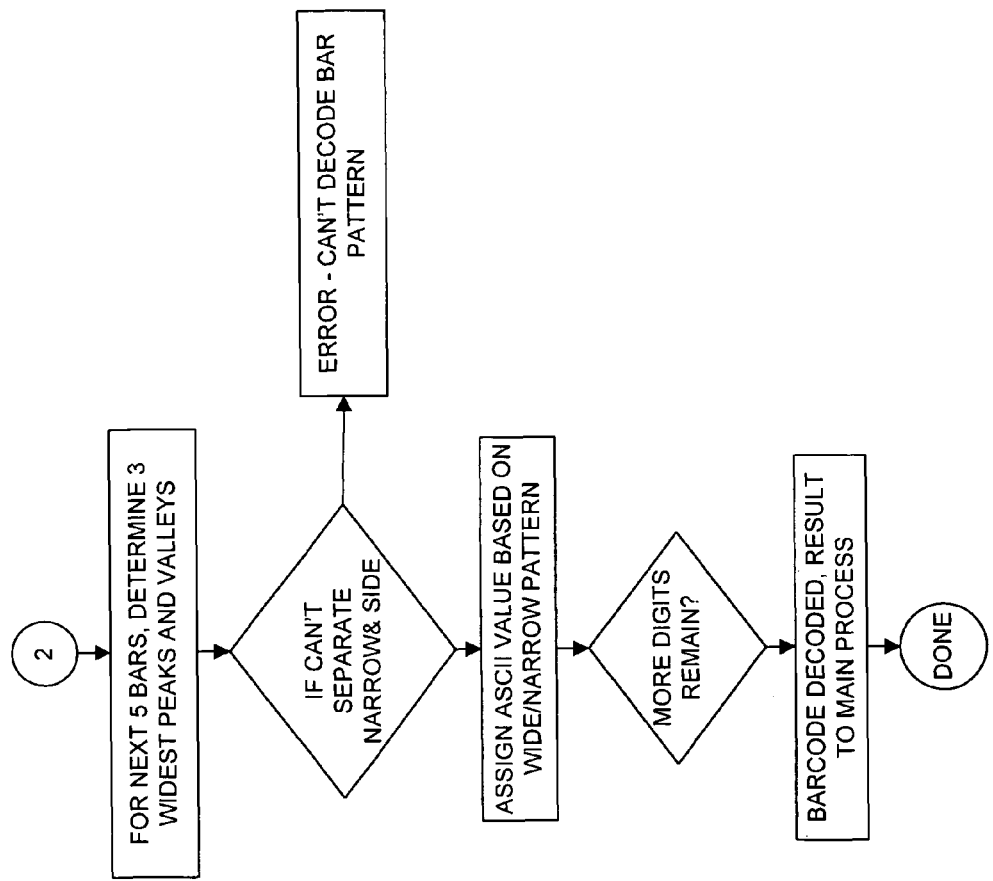

In a further example, information readers 10, 11 (or, depending on the process, one of microprocessors 17, 317, 417) may implement the following exemplary algorithm set forth in FIGS. 6A and 6B.

In another example, information readers 10, 11 (or, depending on the process, one of microprocessors 17, 317, 417) may implement the following exemplary algorithm set forth in C code shown in Computer Program Listing Appendix.

First signal source 15 and/or second signal source 20 may be any known signal source known in the art, for example, a light source, a light-emitting diode (LED), an infrared LED, a red LED, and/or a blue LED. First signal detector 16 and/or second signal detector 19 may be any known signal detector, for example, a light detector, an LED light detector, an infrared light detector, and/or a blue light detector.

Information source 200 may be any known device and/or material capable of carrying information, for example, paper (s), plastic(s), bank note(s), a computer chip(s), and/or metal (s. Information source 200 may have any desired size, shape, and/or configuration, for example, a substantially rectangular paper receipt.

Figure 3A:
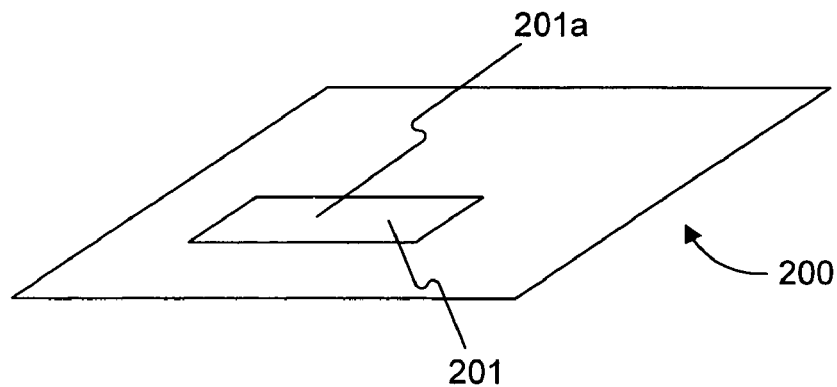
FIGS. 3A and 3B depict an information source, according to another embodiment of the invention.
Figure 3B:
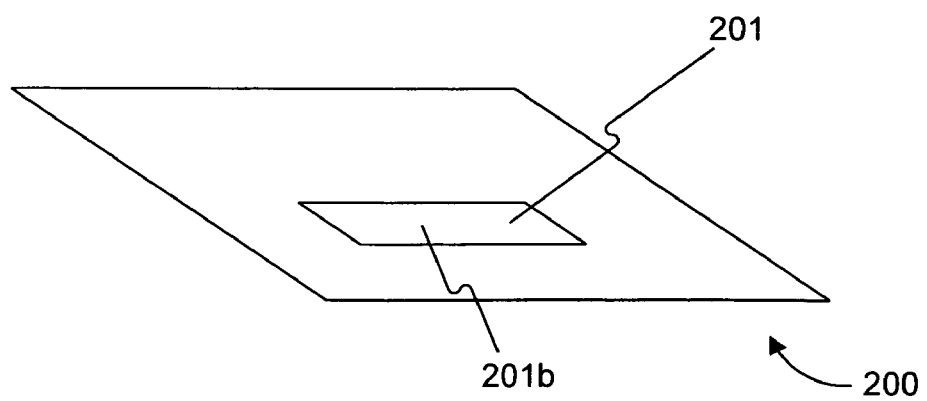
Figure 3C:
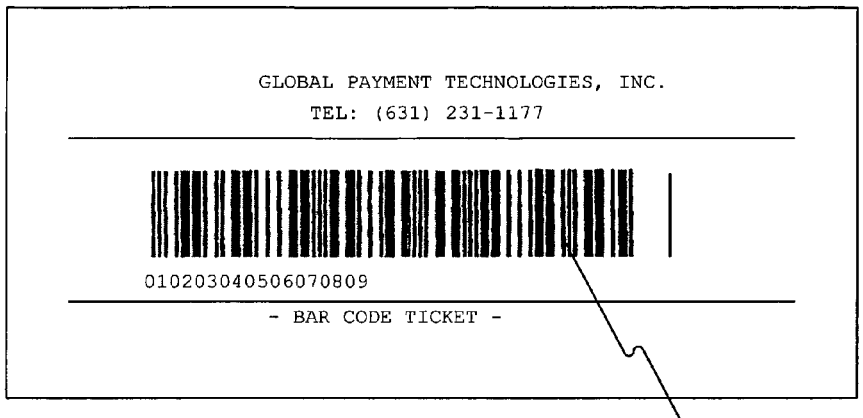
FIG. 3C depicts an information source, according to yet another embodiment of the invention.
Figure 3D:
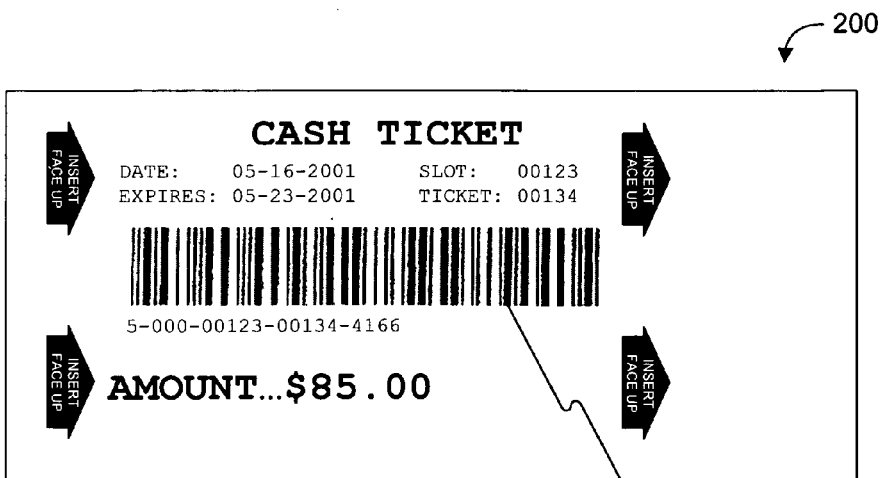
FIG. 3D depicts an information source, according to a yet further embodiment of the invention.

Information 201 may be any information, for example, barcode(s), text, picture(s), personal information, and/or computer code(s). Information 201 may be disposed on information source 200 using any known method, for example, ink(s), chemical(s), watermark(s), depression(s), and/or protrusion(s). Information 201 may be disposed on any portion of information source 200. For example, as shown in FIGS. 3A and 3B, information 201a may be disposed on one side of information source 200, while information source 201b may be disposed on another side of information source 200. Information 201a, 201b may be disposed on substantially opposing portions of information source 200 and/or may be disposed on longitudinally offset portions. Information 201a may be the same as information 201b, or may be different. In another example, information 201 may be disposed on only side of information source 200.

Information source 200 may be transported through validator 100 such that at least one of information readers 10, 11 may read information 201 disposed on information source 200. Validator 100 may be configured such that at least one of information readers 10, 11 may read information 201 disposed on information source 200 as information source 200 is being transported through validator 100. For example, information readers 10, 11 may be disposed on opposite sides of insertion channel 2. In another example, information readers 10, 11 may be disposed such that each of information readers 10, 11 may simultaneously read information 201 from information source 200. In a further example, information readers 10, 11 may be disposed such that information readers 10, 11 cannot simultaneously read information 201 from information source 200. In yet another example, information readers 10, 11 may be staggered and/or offset in a longitudinal direction of insertion channel 2 and/or a transport direction of information source 200, for example, as shown in FIG. 1. This may assist in preventing signals from information readers 10, 11 from interfering with each other. In a yet further example, information readers 10, 11 may be substantially disposed across from each other around insertion channel 2. In still another example, information readers 10, 11, may be disposed substantially parallel to each other. In a still further example, information readers 10, 11, may be disposed at an angle relative to each other. Other configurations of information readers 10, 11 relative to each other are contemplated. Information readers 10, 11, may be configured to continuously operate and/or operate only when information source 200 is positioned such that information readers 10, 11 can read information 201 from information source 200.

Once information source 200 has cleared information readers 10, 11, information source 200 may cease to block the signal from first signal source 15 to first signal detector 16. Accordingly, first signal detector 16 may inform microprocessor 17 that it is no longer receiving a signal or is receiving a signal if previously blocked from first signal source 15 (e.g., by sending a signal or ceasing to send a signal), and in turn microprocessor 17 may deactivate actuator 3. The deactivation of actuator 3 may then cause one or more of gear(s) 4, 5, 6, pulley(s) 7, drive belts 8, 9, roller(s) 12, and drive wheel(s) 14 to cease thereby ceasing the transport of information source 200. At this point, information source 200 may be held in validator 100 in an escrow position.

Before, during, or after information source 200 may be held in an escrow position, microprocessor 17 may be processing information 201 and/or other information sent by information readers 10, 11. For example, microprocessor 17 may determine whether one or more of information 201 and/or other information is valid information 201. If so, information 201 may be sent to another microprocessor 317 disposed in apparatus 300, for example, a gambling machine. In another example, microprocessor 17 may determine whether one or more of information 201 and/or other information is indeed the same information or related information. Microprocessor 17, 317 may also or alternatively process the information 201 and/or other information using any known algorithm.

Microprocessor 17, 317 may transmit the information to central processor 417, for example, a casino's central processor. Central processor 417 may process information 201 using any known algorithm, for example, verify information 201 and then transmit to microprocessor 17, 317 one or more stored values related to information 201, for example, monetary value information. Microprocessor 17, 317 may then signal validator 100 to accept and/or store information source 200. Microprocessor 17, 317 may then display the one or more stored values on apparatus 300, for example, providing credits on the slot machine so that the user may play.

Central processor 417 may also or alternatively decide that information 201 is incorrect, fraudulent, and/or not verified, in which case central processor 417 may send a signal to microprocessor 17, 317 to reject the information source, in which case microprocessor 17, 317 may cause validator 100 to either eject information source 200 and/or store information source 200 without allowing a user to operate apparatus 300.

In another embodiment, validator 100 may be used to read information 201a, 201b that is disposed on two or more portions of information source 200. For example, information 201 may be a barcode number 201 that is too long to be placed on one side of an information source 200 (e.g., barcode number 201 may have more than about 20 characters). In that case, information 201 may be broken up into at least two information portions 201a, 201b and be placed on two or more portions of information source 200, for example, opposite sides of information source 200. Validator 100 may then be used to determine information 201, for example, information readers 10, 11 may each read one of information portions 201a, 201b. Information readers 10, 11 may each read either of information portions 201a, 201b. At least one of information portions 201a, 201b may include additional information different from information 201 that may assist one of microprocessor 17, 317, 417 in determining how information portions 201a, 201b are related, for example, which of barcode number portions 201a, 201b goes "first" to create longer barcode number 201. Such longer barcode numbers 201 may be desirable, for example, to prevent the recycling of barcode numbers.

Figure 5:
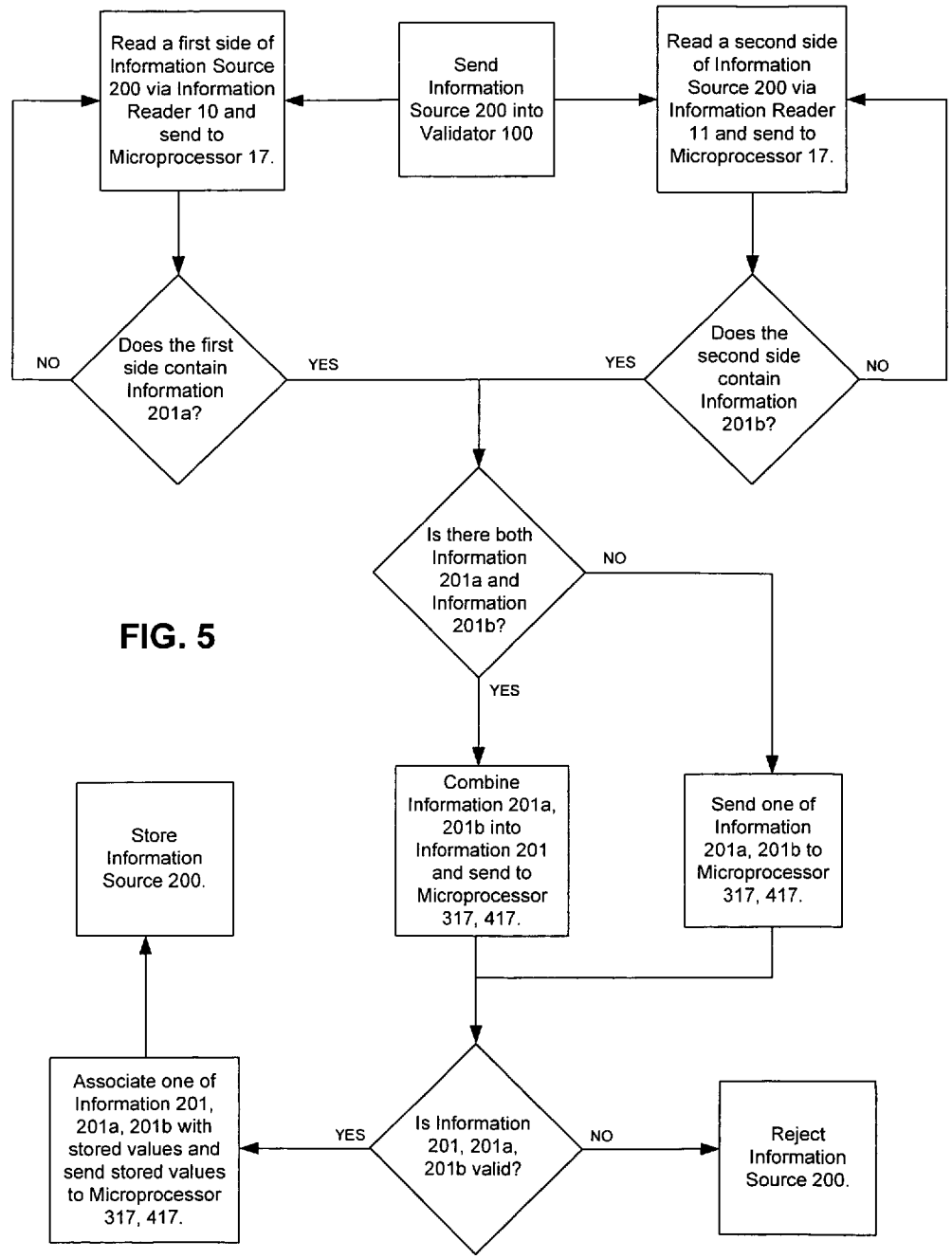
FIG. 5 depicts a method of processing information, according to a further embodiment of the invention.

Embodiments of the invention may include a method of reading information 201 from an information source 200 using validator 100, for example, as shown in FIG. 5. In an example where information 201 is disposed on only one side of information source 200, a user may place information source 200 including information 201 in insertion channel 2. Information source 200 may interrupt a signal between first signal source 15 and first signal detector 16, causing actuator 3 to activate, for example, via first signal detector 16 either sending a signal or ceasing to send a signal to microprocessor 17. Actuator 3 may actuate one or more of gear(s) 4, 5, 6, pulley(s) 7, drive belts 8, 9, roller(s) 12, and drive wheel(s) 14 and cause information source 200 to be transported further into validator 100.

While information source 200 is being transported through validator 100, information source 200 may be sent past information readers 10, 11. One of information readers 10, 11 may read information 201 from one side of information source 200. To read information 201, second signal source 20 from one of information readers 10, 11 may send a signal that may be reflected, altered, and/or changed by information 201 and then detected by second signal detector 19. Second signal detector 19 may then send a signal to microprocessor 17. In the alternative, signal detector 19 may send continuous signals to microprocessor 17, in which case microprocessor 17 may determine which of the signals constitutes information 201. When microprocessor 17 determines that is has received information 201, microprocessor 17 may process information 201 and/or send information 201 to microprocessor 317 in apparatus 300.

Microprocessor 17, 317 may process information 201 using any known algorithm, for example, if information 201 is a barcode, determine the barcode number. Microprocessor 17, 317 may then send information 201 to central processor 417. Central processor 417 may then associate information 201 with stored values, for example, a monetary value information and/or personal information. Central processor 417 may then send one or more of those stored values back to microprocessor 17, 317, and then microprocessor 17, 317 may display the stored values on apparatus 300, for example, display monetary value information on a slot machine. Microprocessor 17, 317 may also at that point allow use of apparatus 300 and/or store information source 300. Central processor 417 may in the alternative determine that information 201 is not valid, and thus send a signal to microprocessor 17, 317 to either reject or retain information source 200. In such a case, apparatus 300 could not be used.

In an example where information 201a, 201b is disposed on both sides of information source 200, a user may place information source 200 including information 201a, 201b in insertion channel 2. Information source 200 may interrupt a signal between first signal source 15 and first signal detector 16, causing actuator 3 to activate, for example, via first signal detector 16 either sending a signal or ceasing to send a signal to microprocessor 17. Actuator 3 may actuate one or more of gear(s) 4, 5, 6, pulley(s) 7, drive belts 8, 9, roller(s) 12, and drive wheel(s) 14 and cause information source 200 to be transported further into validator 100.

While information source 200 is being transported through validator 100, information source 200 may be sent past information readers 10, 11. Each of information readers 10, 11 may read one of information 201a, 201b. Depending on the configuration of information readers 10, 11, information readers 10, 11 may read their respective information 201a, 201b at the same time or at different times. For example, if information 201a, 201b are disposed at substantially corresponding points on opposite sides of information source 200, but information readers 10, 11 are offset in a direction of travel of information source 200 through validator 100, than information readers 10, 11 may read their respective information 201a, 201b at different times. Other configurations or information readers 10, 11 in validator 100 and/or information 201a, 201b on information source 200 are contemplated.

To read information 201, second signal source 20 from one of information readers 10, 11 may send a signal that may be reflected, altered, and/or changed by one of information 201s, 201b and then detected by second signal detector 19. Second signal detector 19 may then send a signal to microprocessor 17 corresponding to one of information 201a, 201b. In the alternative, signal detector 19 may send continuous signals to microprocessor 17, in which case microprocessor 17 may determine which of the signals constitutes information 201a, 201b. When microprocessor 17 determines that is has received information 201a, 201b, microprocessor 17 may process information 201a, 201b and/or send information 201a, 201b to microprocessor 317 in apparatus 300.

Microprocessor 17, 317 may process information 201a, 201b using any known algorithm. For example, if information 201a, 201b (e.g., barcode portions) are different portions of a single piece of information 201 (e.g., a barcode), microprocessor 17, 317 may combine information 201a, 201b into single piece of information 201. One of information 201a, 201b may include additional information that indicates to microprocessor 17, 317 how to combine information 201a, 201b into single piece of information 201. Microprocessor 17, 317 may then send information 201 to central processor 417. Central processor 417 may then associate information 201 with stored values, for example, a monetary value information and/or personal information. Central processor 417 may then send one or more of those stored values back to microprocessor 17, 317, and then microprocessor 17, 317 may display the stored values on apparatus 300, for example, display monetary value information on a slot machine. Microprocessor 17, 317 may also at that point allow use of apparatus 300 and/or store information source 300. Central processor 417 may in the alternative determine that information 201 is not valid, and thus send a signal to microprocessor 17, 317 to either reject or retain information source 200. In such a case, apparatus 300 could not be used.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A validator, comprising:
    a first information reader configured to read a first information portion disposed on a first portion of an information source;
    a second information reader configured to read a second information portion disposed on a second portion of the information source different from the first portion;
    a transporter configured to physically transport the information source past the first information reader and the second information reader such that the first information reader reads the first information portion from the first portion of the information source and the second information reader reads the second information portion from the second portion of the information source; and
    a microprocessor configured to combine the first information portion and a second information portion into a third information portion.

2. The validator of claim 1, further comprising a housing, wherein the first information portion is disposed in the housing on a first side of the information source and the second information portion is disposed in the housing on a second side of the information source different from the first side.

3. The validator of claim 1, further comprising a housing, wherein the at least two information readers are offset from each other in the housing in a direction of transport of the information source.

4. The validator of claim 1, wherein the first information portion is a first barcode portion, the second information portion is a second barcode portion, and the third information portion is a complete barcode.

5. The validator of claim 4, wherein the complete barcode has more than 20 characters.

6. A system including the validator of claim 1.

7. A method, comprising:
    providing a validator including a first information reader and a second information reader;
    inserting an information source into the validator;
    transporting the information source past the first information reader and the second information reader;
    reading a first information portion from the information source via the first information reader and a second information portion from the information source via the second information reader; and
    combining the first information and the second information portion into a third information portion.

8. The method of claim 7, wherein the first information portion is disposed on a first side of the information source and the second information portion is disposed on a second side of the information source different from the first side.

9. The method of claim 7, wherein the first information portion is read by the first information reader during a first time interval and the second information portion is read by the second information reader during a second time interval different from the first time interval.

10. The method of claim 7, wherein the first information portion is a first barcode portion, the second information portion is a second barcode portion, and the third information portion is a complete barcode.

11. The method of claim 7, wherein the complete barcode has more than 20 characters.

* * * * *